United States Patent
May et al.

(10) Patent No.: US 9,209,912 B2
(45) Date of Patent: Dec. 8, 2015

(54) CIRCUIT DEVICES AND METHODS FOR RE-CLOCKING AN INPUT SIGNAL

(75) Inventors: Michael Robert May, Austin, TX (US); Russell Croman, Austin, TX (US); Younes Djadi, Austin, TX (US); Scott Thomas Haban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 883 days.

(21) Appl. No.: 12/621,050

(22) Filed: Nov. 18, 2009

(65) Prior Publication Data

US 2011/0115537 A1    May 19, 2011

(51) Int. Cl.
    *H04L 7/00*   (2006.01)
    *H04B 15/04*   (2006.01)

(52) U.S. Cl.
    CPC .......... *H04B 15/04* (2013.01); *H04B 2215/064* (2013.01); *H04B 2215/065* (2013.01); *H04L 7/0091* (2013.01)

(58) Field of Classification Search
    CPC ............. H04B 15/04; H04B 2215/064; H04B 2215/065; H04B 7/0091
    USPC .................................. 375/355, 344; 327/170
    See application file for complete search history.

(56) References Cited

U.S. PATENT DOCUMENTS

| | | |
|---|---|---|
| 3,506,918 A | 4/1970 | Perreault |
| 4,028,535 A | 6/1977 | Franaszek et al. |
| 4,794,555 A | 12/1988 | Kojima et al. |
| 4,852,121 A | 7/1989 | Kingston et al. |
| 5,272,700 A | 12/1993 | Hansen et al. |
| 5,532,632 A * | 7/1996 | Kent .............................. 327/141 |
| 5,692,166 A | 11/1997 | Milhizer et al. |
| 5,729,166 A | 3/1998 | May et al. |
| 5,731,728 A | 3/1998 | Greiss |
| 5,796,995 A | 8/1998 | Nasserbakht et al. |
| 6,047,021 A | 4/2000 | Grimes et al. |
| 6,060,924 A * | 5/2000 | Sugano ......................... 327/202 |
| 6,104,732 A | 8/2000 | Pearman |
| 6,157,229 A * | 12/2000 | Yoshikawa ..................... 327/149 |
| 6,255,870 B1 * | 7/2001 | Na ................................. 327/149 |
| 6,426,947 B1 * | 7/2002 | Banker et al. .................. 370/254 |
| 6,617,877 B1 * | 9/2003 | Cory et al. ........................ 326/41 |
| 6,768,361 B2 | 7/2004 | Kwak |
| 6,873,318 B1 * | 3/2005 | Wong ............................ 345/204 |
| 6,973,001 B1 * | 12/2005 | Tomita ........................... 365/194 |

(Continued)

OTHER PUBLICATIONS

"How to Reduce EMI and Improve RF Noise Coupling", Mobius Microsystems White Paper, Jul. 22, 2009, pp. 1-10.

(Continued)

*Primary Examiner* — Shuwang Liu
*Assistant Examiner* — Helene Tayong
(74) *Attorney, Agent, or Firm* — Cesari & Reed LLP; R. Michael Reed (57) ABSTRACT

Embodiments include circuit devices and methods for re-clocking an input signal. In an embodiment, a circuit device includes a data storage element having a data input to receive a digital data stream having a first clock rate and including a clock input to receive a clock signal having a second clock rate. The data storage element further includes logic to adjust edge timing of transitions within the digital data stream based on the clock signal to produce a modulated output signal having a power spectrum with spectral nulls at a desired frequency and its harmonics without changing an average data rate.

17 Claims, 10 Drawing Sheets

(56) References Cited

U.S. PATENT DOCUMENTS

| | | | |
|---|---|---|---|
| 7,135,906 B2 * | 11/2006 | Takai et al. | 327/263 |
| 7,391,347 B2 | 6/2008 | May et al. | |
| 7,471,134 B2 | 12/2008 | Dornbusch | |
| 7,791,387 B1 * | 9/2010 | Wong | 327/172 |
| 8,014,476 B2 * | 9/2011 | Filipovic et al. | 375/344 |
| 2003/0123594 A1 | 7/2003 | Glenn et al. | |
| 2004/0161019 A1 | 8/2004 | Raghavan et al. | |
| 2005/0239430 A1 | 10/2005 | Shah | |
| 2006/0045224 A1 * | 3/2006 | Cranford et al. | 375/355 |
| 2006/0165205 A1 * | 7/2006 | Dally | 375/371 |
| 2008/0186618 A1 * | 8/2008 | Wong | 360/77.04 |
| 2008/0197982 A1 * | 8/2008 | Sadr | 340/10.4 |
| 2008/0278211 A1 * | 11/2008 | Heightley | 327/296 |
| 2010/0220828 A1 * | 9/2010 | Fuller et al. | 375/355 |
| 2010/0315141 A1 * | 12/2010 | Cao et al. | 327/161 |

OTHER PUBLICATIONS

Office Action in Chinese Patent Application No. 201010565872.4, Apr. 19, 2013, pp. 1-15.

Beuth, Klaus; Digitaltechnik, 10. Auflage. Wurzburg: Vogel, 1998. Titelseite + Impressum + Seiten 500-503. ISBN 3-8023-1755-6, Printed in Germany.

Office Action, German Patent Application No. 10 2010 043 872.3, Jul. 14, 2014 (10 pages).

* cited by examiner

CIRCUIT DEVICES AND METHODS FOR RE-CLOCKING AN INPUT SIGNAL

FIELD

The present disclosure relates generally to circuit devices and methods for re-clocking an input signal, and more particularly, to circuits and methods for re-clocking input signals in a manner to reduce radiated interference from inter-chip communication links at particular radio frequencies.

BACKGROUND

Digital signals communicated across a communication link between circuits can radiate spectral energy at various radio frequencies, causing interference, sometimes referred to as electromagnetic interference (EMI), with nearby analog receiver circuitry. When such receiver circuitry is tuned to a particular radio frequency (RF) channel, radiated spectral energy can cause interference within the RF channel, which interference appears as random noise or spurs that can impair a signal-to-noise ratio and increase an error rate associated with the RF channel. Hence, there is a need to control such radiated spectral energy.

SUMMARY

Embodiments of circuit devices disclosed herein are configured to alter edge timing of transitions within an input data stream to produce a modulated output signal having spectral nulls in its output power spectrum at a desired frequency and its harmonics. Additionally, embodiments of methods are disclosed for producing a modulated output signal having spectral nulls in its output power spectrum at a desired frequency and its harmonics.

DETAILED DESCRIPTION

Figure 1A:
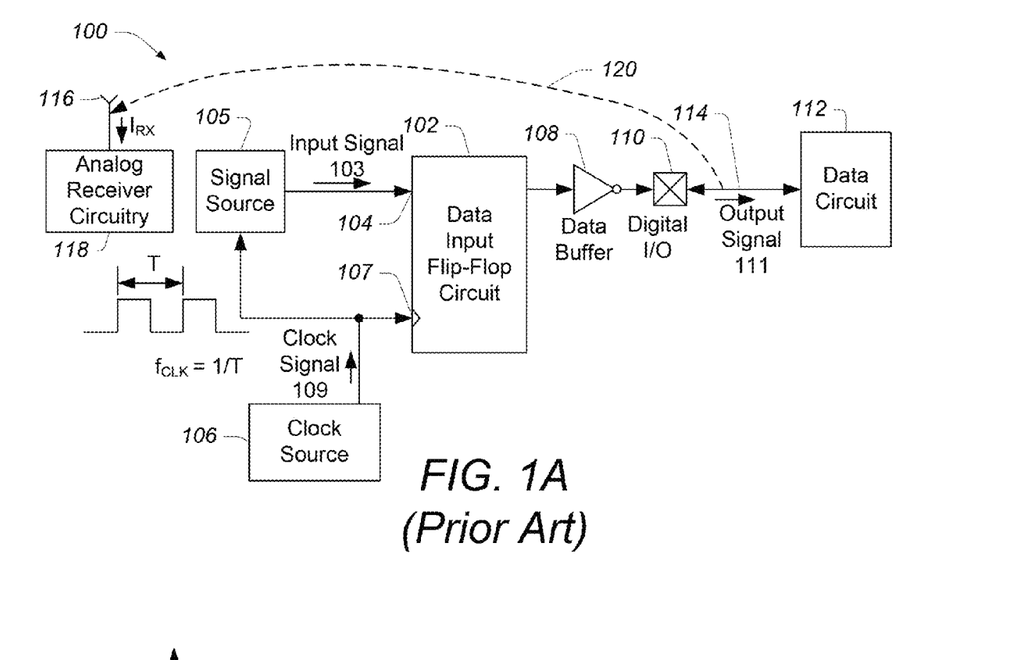
FIG. 1A is a partial block diagram and partial logic diagram of a conventional circuit device to latch a digital data stream at a clock rate and to provide the clocked data to a digital input/output pin.

FIG. 1A is a block diagram of a conventional circuit device 100 to latch a received input signal 103 at a clock frequency and to provide the clocked data to a digital input/output pin 110. Circuit device 100 includes a signal source 105 and a data storage element, such as data input flip-flop circuit 102.

Signal source 105 may be a data storage device, a receiver circuit, or other circuitry configured to produce or provide a digital data stream. Signal source 105 receives clock signal 109 from clock source 106 and provides input signal 103 to input 104 of data input flip-flop 102 at a data rate associated with a clock rate of the clock signal 109.

Data input flip-flop 102 includes data input 104 to receive input signal 103 from signal source 105. Data input flip-flop 102 further includes clock input 107 coupled to clock source 106 to receive clock signal 109. Data input flip-flop circuit 102 also includes an output coupled to digital input/output (I/O) pin 110 through data buffer 108. Data input flip-flop 102 is configured to shift input signal 103 from input 104 to digital I/O pin 110 through data buffer 108 in response to the clock signal 109.

Digital I/O pin 110 is an electrically conductive lead or pad that is coupled to data circuit 112 through communications link 114, which may be an electrical lead, solder bump, wire trace, or other electrically conductive communication path. In an embodiment, communications link 114 can include multiple electrically conductive paths, such as a low-voltage differential signal (LVDS) link.

Data circuit 112 can include digital circuitry configured to process data signals, such as signals received by antenna 116 and/or input signal 103 from signal source 105. In an example, data circuit 112 can include one or more processors, data storage media, digital logic circuitry, other circuitry, or any combination thereof that is configured to process digital data. Further, data circuit 112 can include one or more interfaces to communicate information to a user and to receive audio, video, and/or user selections from the user, such as through components of a mobile communications device, such a speaker, a microphone, a camera, a keypad, and a display, which may be touch-sensitive.

In an embodiment, data input flip-flop circuit 102 shifts a logic value of the input signal 103 at input 104 to its output and into data buffer 108 in response to a rising edge of the clock signal 109. Signal source 105 and data flip-flop 102 receive the clock signal 109 from clock source 106, such that the input signal 103 is clocked at the same clock rate as data provided to data buffer 108 by data input flip-flop circuit 102. The shifted values are communicated as output signal 111 across communications link 114 at the clock rate of clock signal 109.

The output signal 111 on communications link 114 includes spectral nulls at the clock frequency and its harmonics, as can be identified using Fourier Transform analysis, which spectral nulls result primarily from the switching of the output signal 111 at the clock rate. Transitions within output signal 111 communicated on communications link 114 can radiate electromagnetic interference that can interfere with reception at nearby circuitry, such as antenna 116, which is coupled to analog receiver circuitry 118. Such radiated interference (indicated by dashed line 120) may induce current flow at the antenna 116, providing additive noise to received current ($I_{RX}$). Such inductive noise coupling can induce a voltage in the associated receiver circuitry 118 according to the following magnetic coupling equation:

$$Vn = wMI_D \quad \text{(Equation 1)}$$

In Equation 1, the induced voltage (Vn) is a function of the frequency (w) of the digital signal, the mutual inductance (M) between antenna 116 and communications link 114, and a current ($I_D$) associated with output signal 111.

Figure 1B:
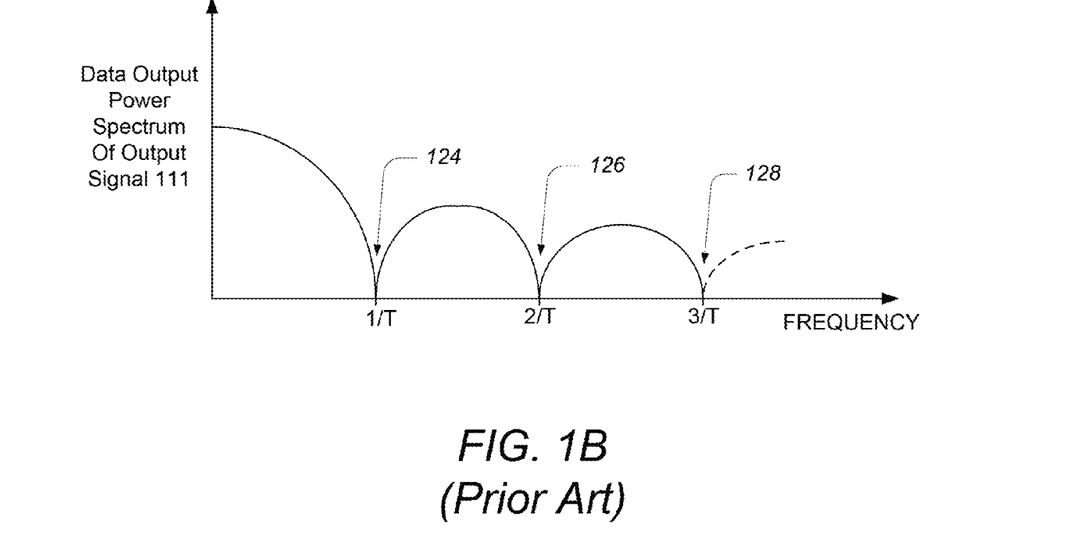
FIG. 1B is a graph of a data output power spectrum, at the digital input/output pin of the conventional circuit device depicted in FIG. 1A, showing spectral nulls at integer multiples of the clock frequency.

FIG. 1B is a graph of a data output power spectrum of output signal 111 depicted in FIG. 1A. Output signal 111 includes spectral nulls 124, 126, and 128 at integer multiples of the clock frequency (i.e., at clock frequency (1/T) and at harmonics of the clock frequency, such as 2/T, 3/T, and so on). Nearby receiver circuitry, such as analog receiver circuitry 118, would experience little interference in radio frequency channels corresponding to the clock frequency or at integer multiples of the clock frequency because of the frequency nulls 124, 126, and 128 in the power spectrum of output signal 111. However, when the nearby receiver circuitry is tuned to other frequencies, it may be desirable to control placement of the spectral nulls to correspond to the desired radio frequency.

While it is possible to adjust the clock frequency of clock signal 109 to move the spectral nulls, changing the clock rate of clock signal 109 changes a data rate of the input signal 103 as well. Such a solution may not be available where data circuit 112 cannot be run at the data rate of the adjusted clock frequency. For example, where data circuit 112 is configured to operate at a fixed frequency, circuit device 100 and data circuit 112 may not communicate properly if the data rate is changed to move the spectral nulls in output signal 111.

However, as discussed below with respect to FIGS. 2A-10, for a data rate of arbitrary frequency, the rising and falling edges of the digital output signal can be constrained (re-clocked) to introduce spectral nulls at desired frequencies in the output power spectrum without changing the average data rate.

Figure 2A:
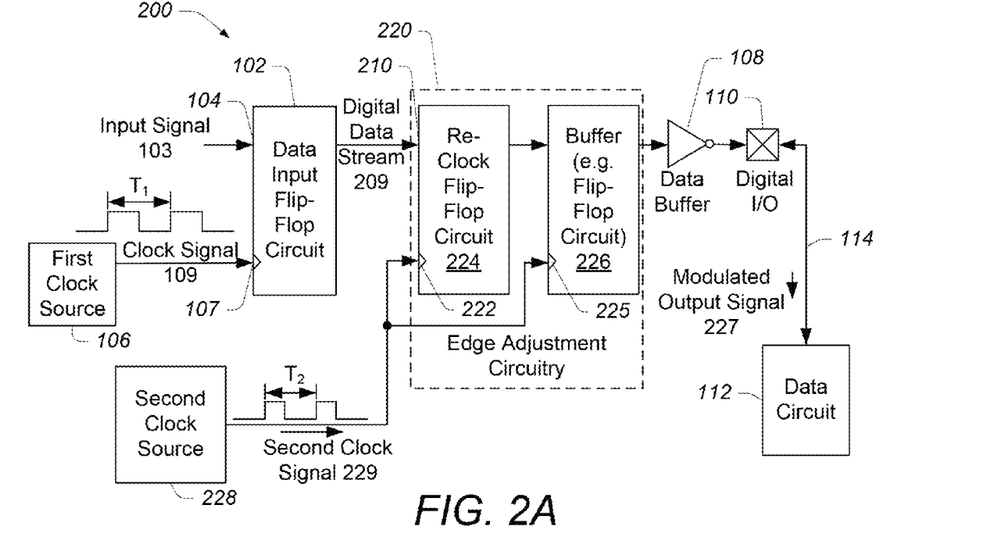
FIG. 2A is a diagram of an embodiment of a circuit device including edge adjustment circuitry configured to re-clock a digital data stream.

FIG. 2A is a block diagram of an embodiment of a circuit device 200 including edge adjustment circuitry 220 configured to re-clock a digital data stream. Circuit device 200 includes a data storage element, such as data input flip-flop circuit 102, and includes edge adjustment circuitry 220. Data input flip-flop circuit 102 receives input signal 103 and provides digital data stream 209 to edge adjustment circuit input 210 of edge adjustment circuitry 220 at a first clock rate associated with clock signal 109.

Edge adjustment circuitry 220 includes a re-clock flip-flop circuit 224 coupled to edge adjustment circuit input 210 to receive the digital data stream 209. Edge adjustment circuitry 220 is also coupled to second clock source 228 through clock input 222 to receive second clock signal 229 having a second clock rate, which may be different from the first clock rate of clock signal 109. The re-clock flip-flop circuit 224 alters edge timing of transitions within the digital data stream 209 to produce a modulated output signal 227 that is provided to data circuit 112 through communications link 114 and data buffers 226 and 108. Data buffer 226 may be a data storage element, such as a flip-flop circuit, that is clocked synchronously with re-clock flip-flop 224 using the second clock signal 229. Data buffer 226 is included to ensure that metastability is not a problem in circuit device 200, which might otherwise be susceptible to some data instabilities due to asynchronous clock signals 109 and 229. In some instances, such as where the second clock signal 229 is derived from clock signal 109 or where data reliability is not required, data buffer 226 may be omitted.

Second clock source 228 may be a local oscillator, a phase lock loop circuit, or other circuitry configured to provide second clock signal 229. In an embodiment, the second clock source 228 may be an adjustable clock source, which may be controlled by a control circuit (such as control circuit 422 shown in FIG. 4). In some embodiments, second clock source 228 can be included within edge adjustment circuitry 220. In other embodiments, second clock source 228 may be external to edge adjustment circuitry 220 (as shown) or even external to circuit device 200.

Second clock source 228 may be controlled to provide the second clock signal 229 at a clock rate selected having a clock period ($T_2$), such that the radio frequency of interest corresponds to the following equation:

$$f_{RF} = n/T_2 \quad \text{(Equation 2)}$$

In Equation 2 for example, the variable (n) can be an integer. Also, note that Equation 2 need not be exact, since the null is broad in the frequency domain and some significant advantage may be obtained if Equation 2 is only approximate. Input data stream 103 is first clocked by data input flip-flop circuit 102 based on a first clock signal 107 having a first clock rate to produce digital data stream 209, which is re-clocked by re-clock flip-flop circuit 224 using second clock signal 229 having a second clock rate ($1/T_2$) that introduces spectral nulls at multiples of the second clock frequency in a power spectrum of the modulated output signal 227, without changing an average data rate of the digital data stream 209.

Figure 2B:
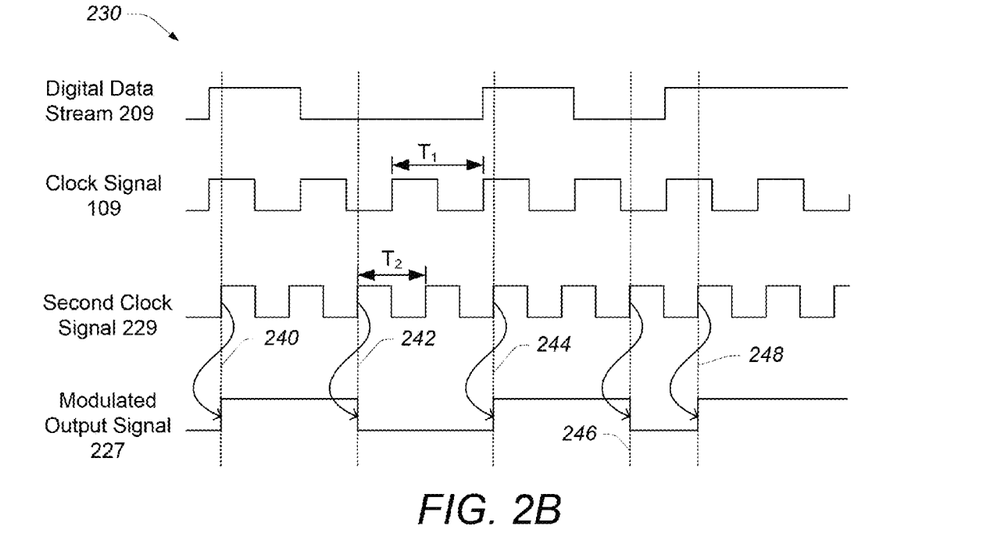
FIG. 2B is a timing diagram depicting data input, data output, and clock signals for the circuit device illustrated in FIG. 2A.

FIG. 2B is a timing diagram 230 depicting digital data stream 109, clock signal 109, second clock signal 229, and modulated output signal 227 for the circuit device 200 illustrated in FIG. 2A. First clock signal 109 has a clock period ($T_1$), and second clock signal 229 has a clock period ($T_2$).

As shown, modulated output signal 227 is a function of the period of the second clock signal 229. In particular, modulated output signal 227 transitions at 240 from low to high in response to digital data stream 209 and a rising edge of second clock signal 229. After digital data stream 209 transitions from high to low, modulated output signal 227 transitions from high to low at 242, which corresponds to a next rising edge of second clock signal 229 after digital data stream 209 has transitioned. Modulated output signal 227 again transitions from low to high at 244 and from high to low at 246, which transitions correspond to a value of digital data stream 209 when second clock signal 229 transitions from low to high. Modulated output signal 227 transitions again at 248, which transition corresponds to a value of digital data stream 209 and a rising edge of second clock signal 229.

As shown, transition edges of modulated output signal 227 are shifted relative to edges within digital data stream 209. Further, edge intervals of the modulated output signal 227 are altered relative to edge intervals between rising and falling edges within digital data stream 209. However, the average data rate is not changed. In particular, the average data rate of the digital data stream 209 is related to first clock signal 109, which clock rate remains unchanged. Re-clock flip-flop circuit 224 re-clocks digital data stream 209, altering edge timing relative to the digital data stream 209 without changing the average data rate.

Adjusting a frequency of second clock signal 229 will alter edge timing and alter edge intervals in the modulated output signal 227. However, the input data rate of digital data stream 209 may be independent of (asynchronous relative to) the selected clock frequency of second clock signal 229, making it possible to introduce the spectral nulls without altering an average data rate of the digital data stream 209, because data in digital data stream 209 continues to be transmitted at the same rate related to first clock signal 109 (with small shifts in edge interval timing).

Figure 2C:
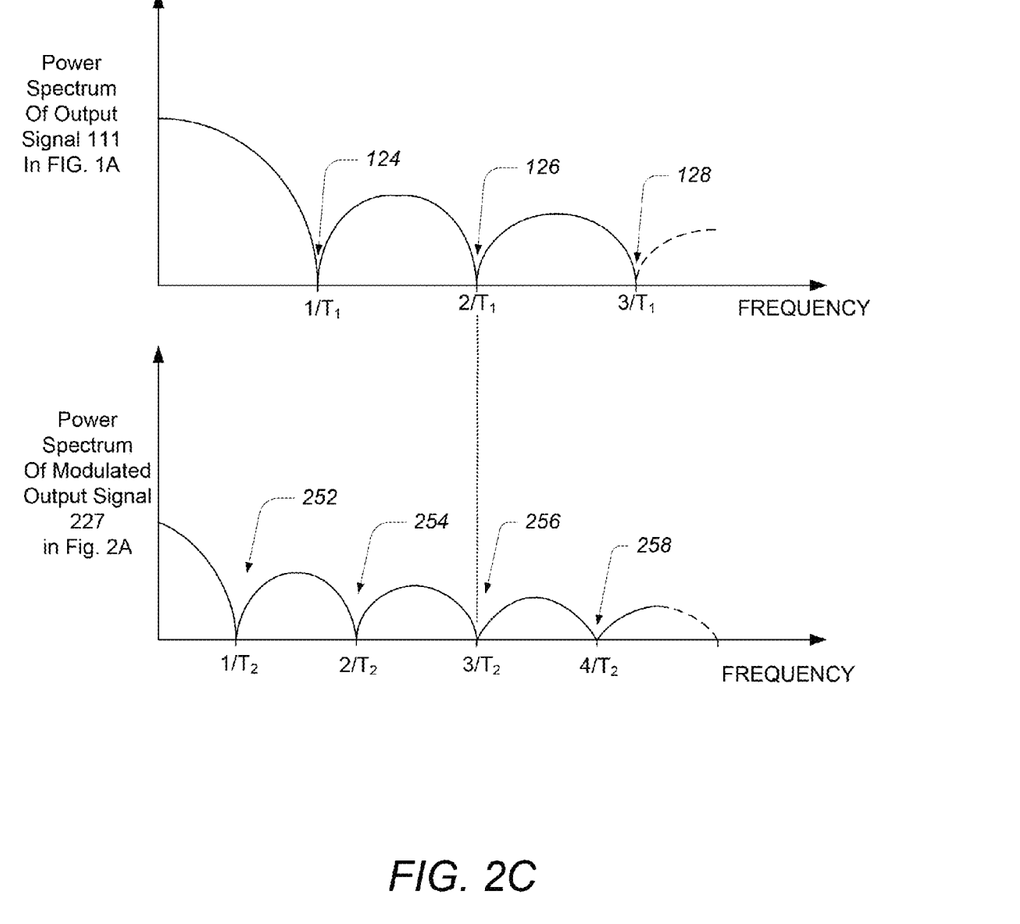
FIG. 2C depicts graphs of a first output power spectrum of a data signal clocked at a first clock rate and a second output power spectrum of the data signal re-clocked at a second clock rate using the circuit depicted in FIG. 2A.

FIG. 2C depicts graphs of a first output power spectrum of output signal 111 (depicted in FIG. 1A) clocked at a first clock frequency associated with clock signal 109 and an altered output power spectrum of modulated output signal 227 re-clocked using second clock signal 229 depicted in FIG. 2A. As previously discussed with respect to FIG. 1B, if the data were communicated at the first clock frequency, the resulting signal would include spectral nulls at 124, 126, and 128 corresponding to multiples of the clock frequency ($1/T_1$).

However, edge adjustment circuit 220 applies second clock signal 229 to produce modulated output signal 227 having an altered output power spectrum with spectral nulls 252, 254, 256, and 258 at multiples of the frequency (i.e., $n/T_2$) of the second clock signal 229 (depicted in FIG. 2B). The frequency of the second clock signal 229 may be selected to correspond to a radio frequency of interest (i.e., a radio frequency to which nearby receiver circuitry is tuned). Such clock frequency selection can be used to place spectral nulls at the frequency of interest, reducing radiated interference at that frequency and its harmonics. Since the edge adjustment circuit 220 alters edge timing of the digital data stream 209, the resulting modulated output signal 227 includes the spectral nulls without altering an average data rate of the digital data stream 209.

In some instances, digital output rise and falls times may not be exactly symmetric either due to differences in the current flow paths (pull-up current flow path versus pull-down current flow path) or due to fabrication differences between field-effect transistors (p-channel FETs and/or n-channel FETs) for pull-up or pull-down drive circuitry. For a spectral null to be provided in an output power spectrum of modulated output signal 227 at a desired frequency using the circuit device 200, a rising pulse should equal the inverted falling pulse of the communicated data signal so that positive pulses are cancelled by equal negative pulses. However, if the rising and falling edges are not precisely controlled to provide equal pulse durations and equal pulse areas for both pull-up and pull-down pulses (as depicted in timing diagram 300 in FIG. 3A), spectral nulls in the output power spectrum may be partially filled-in because the two signals do not cancel exactly.

Additionally, current flow associated with a pull-up pulse may follow a different current path to ground than current flow associated with a pull-down pulse. In such instances, even when transistor properties are precisely controlled, magnetic coupling may be impacted by the different current flow paths, also producing imbalanced pulses such that the spectral nulls may be partially filled-in.

Figure 3A:
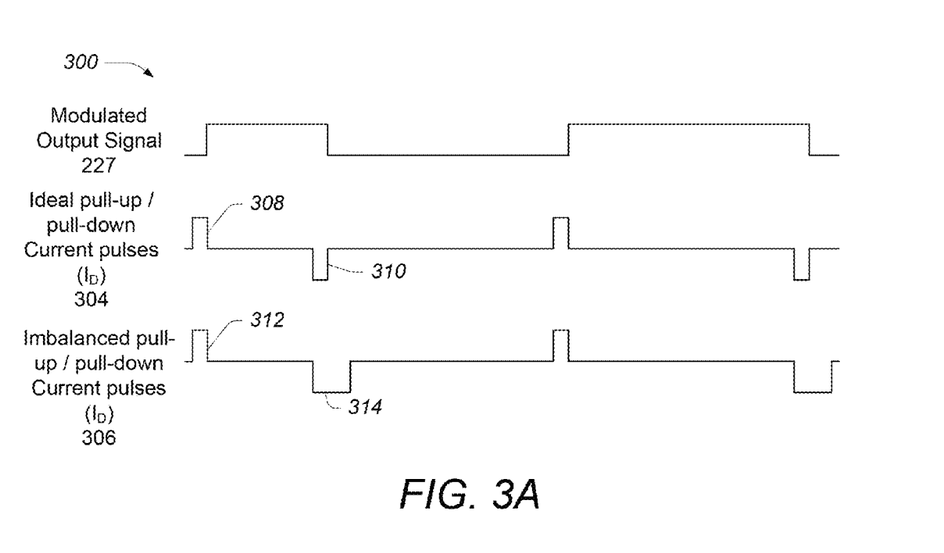
FIG. 3A is a timing diagram illustrating ideal pull-up and pull-down pulses and imbalanced pull-up and pull-down pulses.

FIG. 3A is a timing diagram 300 illustrating an ideal current 304 as compared to imbalanced pull-up and pull-down currents 306 relative to the modulated output signal 227. Ideal current 304 includes pull-up and pull-down pulses, such as pulses 308 and 310, respectively, which are used to create corresponding rising and falling edges of modulated output signal 227. In an example, pull-up current pulses are used to drive the digital I/O pin 110 to create a rising edge of modulated output signal 227. Pull-down current pulses are used to drive the digital I/O pin 110 to create a falling edge of the modulated output signal 227.

In some digital circuits, digital output rise and fall times may not be exactly symmetric. For example, a current path for a digital I/O pin being driven low may differ from a current path for the digital I/O pin being driven high. Such differences may be reflected in different durations for the pull-up pulses, such as pulse 312, as compared to the pull-down pulses, such as pulse 314. Such different durations can produce imbalances that reduce or fill-in spectral nulls in the power spectrum of the modulated output signal 227.

Figure 3B:
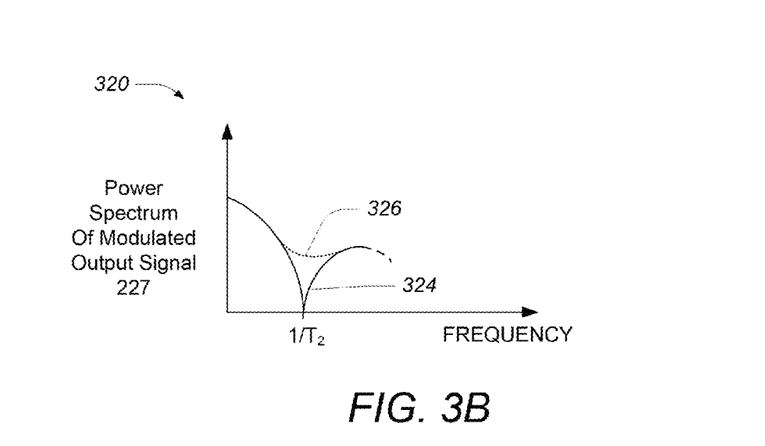
FIG. 3B is a diagram of an output power spectrum illustrating a spectral null at a desired frequency for the ideal signal of FIG. 3A and spectral spreading at the desired frequency for the imbalanced signal of FIG. 3A.

FIG. 3B is a diagram of an output power spectrum 320, for the ideal current 304 and the imbalanced current 306 depicted in FIG. 3B, illustrating a spectral null 324 at a desired frequency ($1/T_2$) from the ideal current 304 and spectral spreading (fill-in) 326 at the desired frequency, which spreading is due to the imbalanced pull-up and pull-down pulses 312 and 314. Such spectral spreading 326 partially erases the spectral null 324, radiating energy at the desired frequency and its harmonics ($n/T_2$), which radiated energy can interfere with reception at nearby analog receiver circuitry. To use the pull-up pulse to cancel the pull-down pulse, the pulses should be symmetric, which symmetry may be difficult to achieve.

However, it is possible to cancel a pull-up pulse using a nearby pull-up pulse and to cancel a pull-down pulse using a nearby pull-down pulse to create spectral nulls. In such an example, asymmetries between rising and falling pulses can be ignored. In a particular example, if edge timing of nearby positive pulses and nearby negative pulses are adjusted to be an integer plus one-half number of radio frequency ($T_2$) periods apart (i.e., $(n+0.5) T_2$), respectively, spectral nulls are introduced in the output power spectrum of the modulated output signal independent of pull-up/pull-down pulse symmetry as discussed below with respect to FIG. 4.

Figure 4:
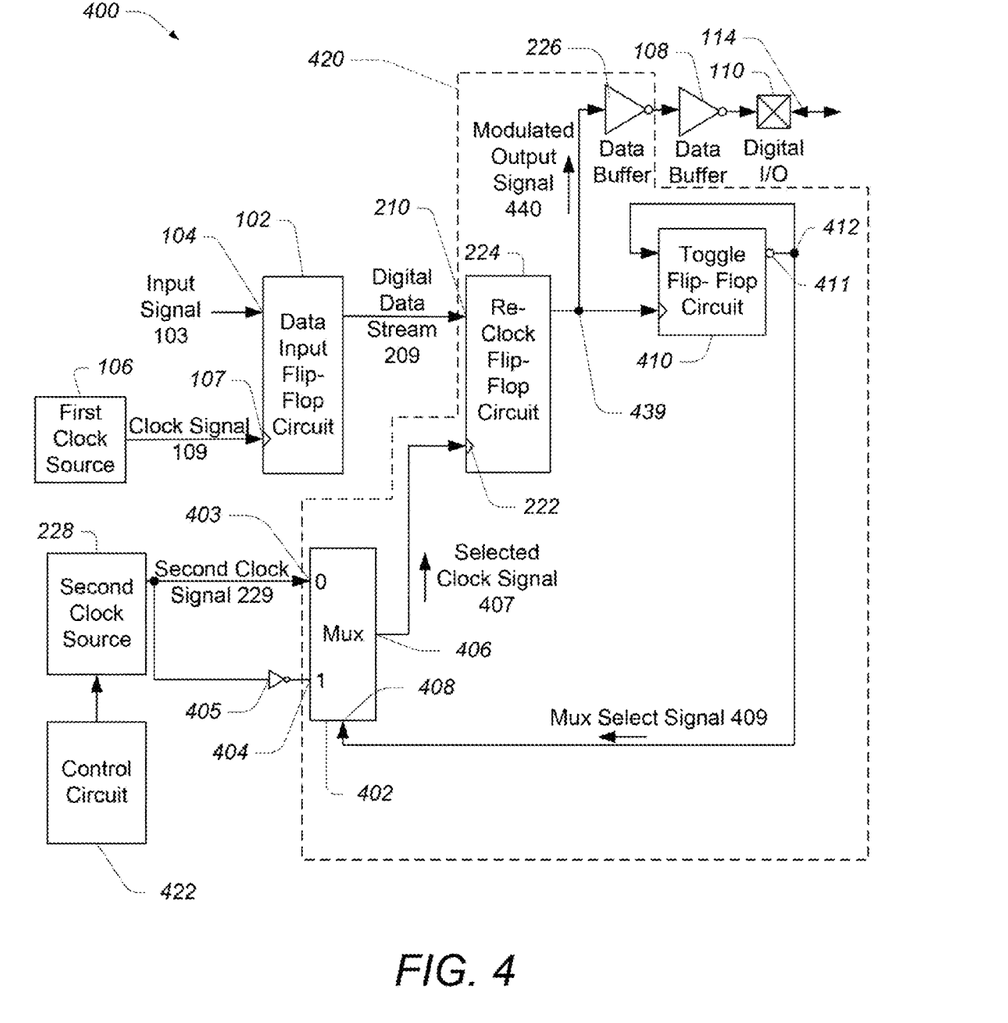
FIG. 4 is a diagram of a second embodiment of a circuit device including edge adjustment circuitry configured to re-clock a received data signal.

FIG. 4 depicts a block diagram of a second embodiment of a circuit device 400 including edge adjustment circuitry 420 configured to re-clock digital data signal 209. Edge adjustment circuitry 420 re-clocks received signals in such a way as to introduce spectral nulls at desired frequencies within a modulated output signal 440 independent of asymmetries between the pull-up and pull-down pulses.

Circuit device 400 includes edge adjustment circuitry 420 including edge adjustment circuit input 210 to receive digital data stream 209. Edge adjustment circuitry 420 includes a multiplexer 402 having first input 403 coupled to second clock source 228 to receive second clock signal 229 having a clock rate ($1/T_2$) and having a second input 404 coupled to second clock source 228 through inverter 405 to receive an inverted version of the second clock signal 229. Multiplexer 402 also includes a MUX select input 408 coupled to node 412 to receive MUX select signal 409 and includes multiplexer output 406 to provide selected clock signal 407 to clock input 222 of re-clock flip-flop circuit 224.

Re-clock flip-flop circuit 224 receives digital data stream 209 and receives selected clock signal 407 (i.e., either the second clock signal 229 or an inverted version of the second clock signal). Re-clock flip-flop circuit 224 latches the digital data stream 209 at a second clock rate associated with selected clock signal 407 and provides modulated output signal 440 to node 439.

Edge adjustment circuitry 420 also includes logic circuitry, such as toggle flip-flop circuit 410, which has a clock input coupled to node 439, an output coupled to node 412 through inverter 411, and a data input coupled to node 412. Edge adjustment circuitry 420 also includes data buffer 226 including an input coupled to node 439 and an output coupled to communications link 114 through data buffer 108 and digital I/O pin 110. As previously discussed with respect to FIG. 2A, data buffer 226 may be a flip-flop circuit that also receives the selected clock signal 407.

Second clock source 228 is coupled to control circuit 422, which is configured to control a clock rate of the second clock signal 229. In a particular example, control circuit 422 adjusts second clock source 228 to produce the second clock signal 229 having a clock frequency (1/T$_2$) that corresponds to a radio frequency of interest with respect to nearby analog receiver circuitry.

In an example, the second clock signal 229 from second clock source 228 is received at multiplexer input 403 and an inverted version of the second clock signal is received at multiplexer input 404. Multiplexer 402 provides either the second clock signal 229 or an inverted version of the second clock signal to multiplexer output 406 as selected clock signal 407 based on MUX select signal 409 received from node 412.

Re-clock flip-flop circuit 224 shifts the digital data stream 209 from edge adjustment circuit input 210 to node 439 based on rising edges of the selected clock signal 407, which rising edges may represent either the rising edge or the falling edge of the second clock signal 229 depending on the MUX select signal 409.

The modulated output signal 440 at node 439 is provided to communications link 114 through data buffer 226, data buffer 108 and digital I/O pin 110. Transitions within the modulated output stream 440 at node 439 cause toggle flip-flop circuit 410 to change a value of the MUX select signal 409 at node 412. In particular, each time re-clock flip-flop circuit 224 outputs a rising edge in modulated output signal 440 at node 439, toggle flip-flop circuit 410 changes its output at node 412, changing the MUX select signal 409 on multiplexer select input 408 and altering the selected clock signal 407. The selected clock signal 407 on multiplexer output 406 is received at clock input 222 to re-clock flip-flop circuit 224, altering edge timing of transitions within the digital data stream 209 to produce modulated output signal 440 having a power spectrum with spectral nulls at a desired frequency and its harmonics.

In an embodiment, edge timing of rising and falling edges can be adjusted such that adjacent rising edges are spaced apart by a number plus one-half clock periods of the second clock signal 229 (i.e., (n+1/2) T$_2$). Falling edges can be spaced apart by the same interval. In this instance, the second clock signal at clock input 403 is controlled by controller 420 to have an approximate frequency (1/T$_2$), as shown in Equation 3 below:

$$f_{RF} = \frac{1}{nT_2} \quad \text{(Equation 3)}$$

By moving edge interval timing of transitions within the modulated output signal 440 relative to such transitions within the received digital data stream, it is possible to cancel pull-up pulses with nearby pull-up pulses and pull-down pulses with nearby pull-down pulses, so that symmetry between pull-up and pull-down current pulses is not required. In an example, where the modulated output signal 440 is convolved with a sinusoidal signal, transition edges of the modulated output signal 440 can be shifted so that a first pull-up pulse corresponds to a positive portion of a sinusoidal signal and an adjacent pull-up pulse is moved to correspond to a negative portion of the sinusoidal signal. Thus, rising edges are shifted to cancel energy from adjacent rising edges and falling edges are shifted to cancel energy from adjacent falling edges, allowing for insertion of spectral nulls independent of pull-up/pull-down pulse symmetry.

Figure 5:
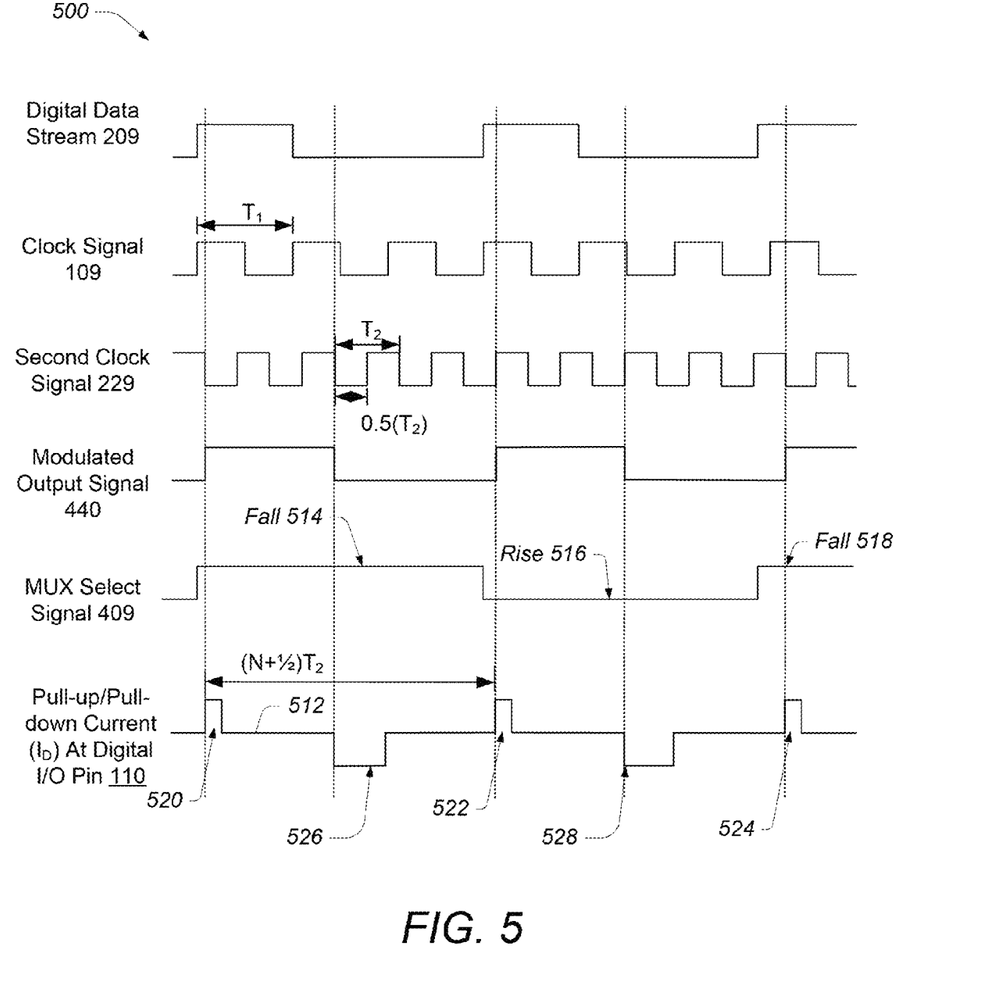
FIG. 5 is a timing diagram illustrating signals associated with the circuit device of FIG. 4.

FIG. 5 depicts a timing diagram 500 illustrating signals associated with the circuit device 400 of FIG. 4. Timing diagram 500 includes digital data stream 209 having a first clock rate that corresponds to clock signal 109. Timing diagram 500 further includes second clock signal 229 having a second clock rate. Timing diagram 500 further includes modulated output signal 440, MUX select signal 409, and pull-up/pull-down current (I$_D$) 512.

When MUX select signal 409 indicates a falling edge select 514, the output pull-up current (I$_D$) pulse 520 rises with the falling edge of second clock signal 229 when the digital data stream 209 is high and pull-down current pulse 526 falls with the falling edge of second clock signal 229 when digital data stream 209 is low. When the MUX select signal 409 indicates a rising edge select 516, the output pull-up current (I$_D$) pulse 522 and the output pull-down pulse 528 transition with a rising edge of second clock signal 229. Thus, the edge interval (period) between rising pulses 520 and 522 is shifted by an integer plus one-half times a period of the second clock signal (i.e., (N+1/2) T$_2$). Similarly, edge interval timing between rising pulses 522 and 524 and between falling pulses 526 and 528 may also be shifted by the same period. The fractional component (0.5*T$_2$) relates to the timing difference between the rising edge and the falling edge of the second clock signal 229 within a given clock period. Thus, alterations to edge timing of rising and falling edges of the modulated output signal 440 are constrained by the second clock signal 229 to place the spectral nulls at a desired frequency and its harmonics in the output power spectrum. Moreover, since the data rate is controlled by the clock signal 109 having a first clock rate and since the edge timing is constrained by the digital data stream 209 and by the second clock signal 229, edge timing variations can be introduced without changing the average data rate.

Figure 6:
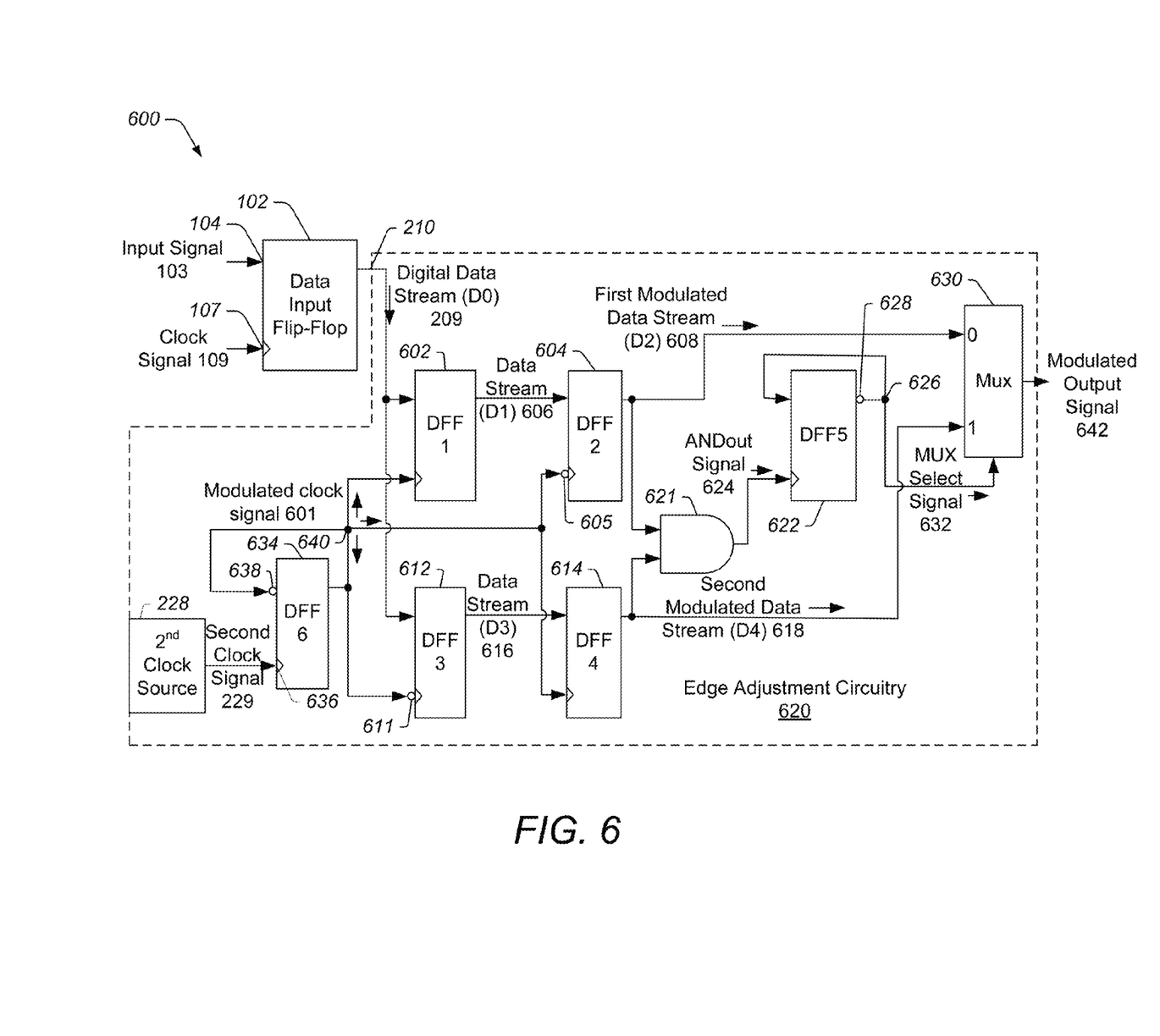
FIG. 6 is a diagram of a third embodiment of a circuit device including edge adjustment circuitry configured to re-clock a received data signal.

In practice clock source 229 may not have nearly 50% duty cycle and this would lead to degraded performance. Clock source 229 may be routed a considerable distance on chip, and the clock buffer may degrade the duty cycle of the signal. To solve this problem, the implementation shown in FIG. 4 can be adjusted, so that a new clock input is used that is running at twice the rate of that shown in FIG. 4. This embodiment is shown in FIG. 6. FIG. 6 is a block diagram of a third embodiment of a circuit device 600 including edge adjustment circuitry 620 configured to re-clock input signal 103. Edge adjustment circuitry 620 includes a first flip-flop (DFF1) 602 to receive digital data stream (D0) 209 and to receive a modulated clock signal 601 related to second clock signal 229 from node 640. In an example, modulated clock signal 601 is an approximately fifty-percent duty cycle clock signal derived from second clock signal 229.

First flip-flop (DFF1) 602 latches digital data stream 209 according to rising edges of the modulated clock signal 601 to produce a data stream (D1) 606. Edge adjustment circuitry 620 further includes second flip-flop (DFF2) 604 to latch data stream (D1) 606 based on falling edges of modulated clock signal 601 received through inverted clock input 605 to produce first modulated data stream (D2) 608.

Additionally, edge adjustment circuitry 620 includes third flip-flop (DFF3) 612 to receive digital data stream (D0) 209 on a falling edge of modulated clock signal 601 received through inverted clock input 611 to produce data stream (D3) 616. Edge adjustment circuitry 620 also includes fourth flip-flop (DFF4) 614 to latch data stream (D3) 616 based on rising edges of modulated clock signal 601 to produce second modulated data stream (D4) 618.

Further, edge adjustment circuitry 620 includes logical AND gate 621 having a first AND input to receive first modulated data stream (D2) 608, a second AND input to receive second modulated data stream (D4) 618, and an AND output to provide an ANDout signal 624 to a clock input of fifth flip-flop (DFF5) 622. Fifth flip-flop (DFF5) 622 includes an output coupled to node 626 through inverter 628 and includes an input coupled to node 626. Thus, logical AND gate 621 is arranged in a bi-stable configuration adapted to alternate its output with each new rising edge of the ANDout signal 624.

Edge adjustment circuitry 620 also includes multiplexer 630 including a first multiplexer input to receive first modulated data stream (D2) 608 and a second multiplexer input to receive second modulated data stream (D4) 618. Multiplexer 630 further includes a multiplexer select input coupled to node 626 to receive MUX select signal 632 and includes multiplexer output to provide modulated output signal 642, for example, to digital I/O pin 110 through one or more buffers, such as data buffer 108. Multiplexer 630 is responsive to MUX select signal 632 to selectively output one of the first and second modulated data streams 608 or 618 as the modulated output signal 642. Since the value of the MUX select signal 632 transitions in response to transitions within first and second modulated data streams 608 and 632 (i.e., transitions within the ANDout signal 624), multiplexer 630 is toggled by logical AND gate 621 each time the data transitions, thereby altering edge timing of the data output signal by controlling multiplexer 630 to output either the first or the second modulated data stream 608 or 618.

Edge adjustment circuitry 620 also includes sixth flip-flop (DFF6) 634 including a input coupled to node 640 through inverter 638, a clock input 636 coupled to second clock source 228 to receive second clock signal 229, and a output coupled to node 640. In an embodiment, sixth flip-flop (DFF6) 634 produces the modulated clock signal 601 at the radio frequency ($1/2T_2$) of second clock signal 229 to clock data into first, second, third, and fourth flip-flops 602, 604, 612, and 614 so that the spectral nulls are produced in the output power spectrum of modulated output signal 642 at the desired frequency and its harmonics without requiring a 50% duty cycle on the second clock signal 229.

In an example, first flip-flop (DFF1) 602 shifts digital data stream 209 from edge adjustment circuit input 210 on a first edge of the second clock signal (such as on a rising edge of a clock pulse) at node 640. Third flip-flop (DFF3) 612 reads in the digital data stream 209 from edge adjustment circuit input 210 on a second edge of the second clock signal (such as on a falling edge of the clock pulse). The timing offset created by latching the digital data stream 209 at the rising and falling edges of the modulated clock signal 601 produces a phase difference in the data at the first and third flip-flops 602 and 612 at any given point in time, which phase difference is equal to the clock period ($T_2$) of second clock signal 229.

Second flip-flop (DFF2) 604 reads in data stream (D1) 606 on a falling edge of the modulated clock signal 601, while fourth flip-flop (DFF4) 614 reads in the data stream (D3) 616 on a rising edge of the modulated clock signal 601 (i.e., on a rising edge of a next clock pulse). Thus, the modulated data stream (D2) 608 is presented on a falling edge of the same clock pulse in which the digital data stream 209 was read from the edge adjustment circuit input 210. In contrast, the modulated data signal (D4) 618 is presented on a rising edge of the next clock pulse.

Logical AND gate 621 varies its output based on the values first and second modulated data streams (D2) 608 and (D4) 618. Each time ANDout signal 624 transitions from low to high, fifth flip-flop (DFF5) 622 toggles the output at node 626, altering a value of MUX select signal 632 provided to multiplexer 630. The MUX select signal 632 controls whether multiplexer 630 outputs the first modulated data stream (D2) 608 or the second modulated data stream (D4) 618.

Thus, edge timing of transitions within the modulated output signal 642 is determined by the modulated clock signal 601 derived from the second clock signal 229 and by transitions within first and second modulated data streams 608 and 618 at inputs to logical AND gate 621. By altering edge timing, spectral nulls can be introduced in the output power spectrum of modulated output signal 642 at a desired radio frequency and its harmonics without altering an average data rate relative to a data rate of the digital data stream 209.

Figure 7:
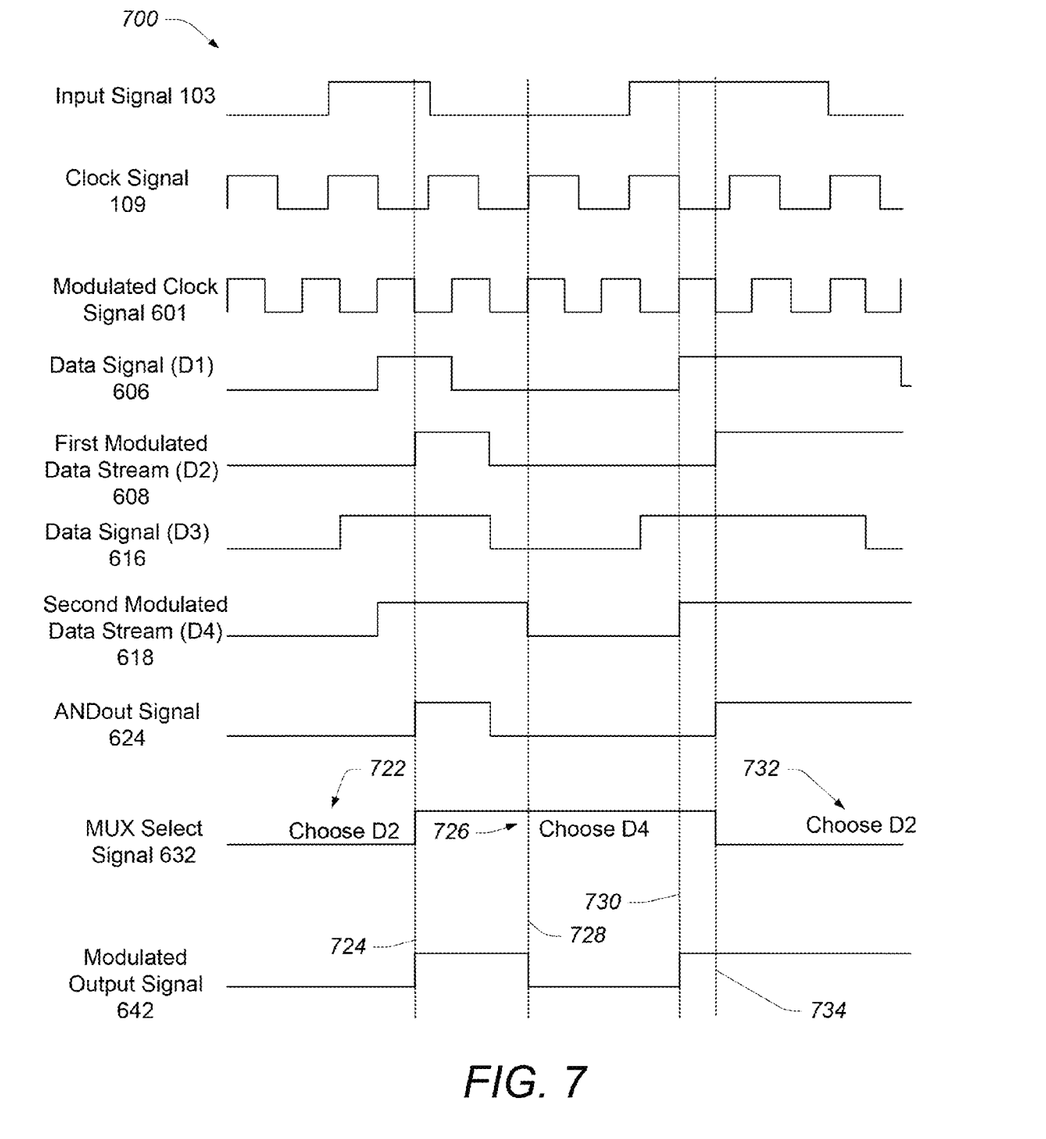
FIG. 7 is a timing diagram illustrating signals associated with the circuit device of FIG. 6.

FIG. 7 depicts a timing diagram 700 illustrating signals associated with the circuit device 600 of FIG. 6. Timing diagram 700 includes input signal 103 and first clock signal 109. Timing diagram 700 further includes modulated clock signal 601, data signal (D1) 606, data signal (D3) 616, first modulated data stream (D2) 608, and second modulated data stream (D4) 618. Further, timing diagram 700 includes ANDout signal 624, MUX select signal 632, and modulated output signal 642.

ANDout signal 624 transitions from low to high when one of the first and second modulated data streams 608 and 618 is high and the other transitions to high. Further, when both first and second modulated data streams 608 and 618 are high, ANDout signal 624 transitions to low when either first or second modulated data streams 608 or 618 transitions from high to low.

Multiplexer select signal 632 transitions on each rising edge of the ANDout signal 624. Thus, multiplexer select signal 632 changes based on transitions within the first and second modulated data streams 608 and 618. Multiplexer 630 is responsive to multiplexer select signal 632 to selectively output the first modulated data stream (D2) 608 at 722, the second modulated data stream (D4) 618 at 726, and the first modulated data stream (D2) 608 again at 732. Modulated output signal 642 tracks first modulated data stream (D2) 608 until the multiplexer select signal 642 transitions at 724, at which point modulated output signal 642 tracks second modulated data stream (D4) 618. Modulated output signal 642 continues to track second modulated data stream (D4) 618, transitioning to a logic high level with second modulated data stream (D4) 618 at 728, and then is toggled by multiplexer select signal 632 to follow first modulated data stream (D2) 608 at transition 730. After transition 730, the ANDout signal 624 transitions at 734, toggling the multiplexer select signal 632 to cause the multiplexer to output the second modulated data stream (D4) 618. However, the modulated output signal 642 remains at a logic high level because both the second modulated data stream (D4) 618 is at the same logic high level as the first modulated data stream (D2) 608.

Edge timing of transitions within the modulated output signal 642 is altered relative to edge timing of transitions within input signal 103. As discussed above, altering the edge timing can produce spectral nulls at desired frequencies in the output power spectrum of the modulated output signal 642. Such spectral nulls reduce radiated interference for nearby receiver circuitry at the desired frequency and its harmonics.

Figure 8:
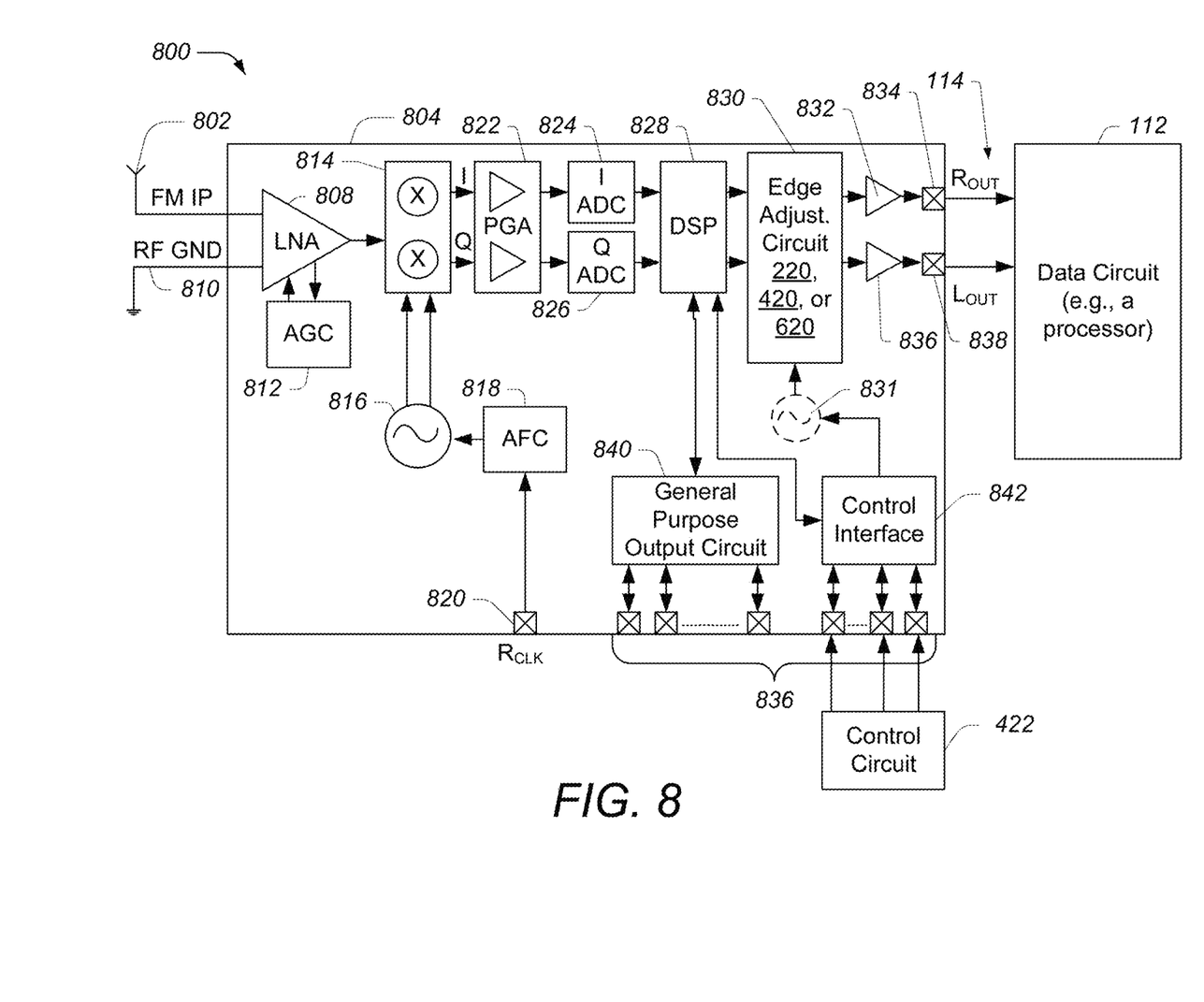
FIG. 8 is a diagram of a communications device including a circuit device with edge adjustment circuitry to re-clock the digital signals to selectively alter edge timing of the digital signals.

FIG. 8 is a block diagram of an embodiment of a communications device 800, which includes edge adjustment circuitry 830 configured to re-clock the digital signals to selectively alter edge timing of the digital signals. Communications device 800 can be a mobile telephone, personal digital assistant, media player (audio, video, etc.), or other electronic device configured to receive RF signals and to communicate data related to received RF signals to adjacent circuitry, such as data circuit 112.

Communications device 800 includes antenna 802 coupled to data circuit 112 through signal processing circuit 804. Signal processing circuit 804 includes a low noise amplifier 808 including a first input coupled to antenna 802 and a second input coupled to an electrical ground 810. Low noise amplifier 808 has an output coupled to mixer 814, which receives clock signals from local oscillator 816 and mixes received analog radio frequency signals with the clock signals to produce in-phase (I) and quadrature (Q) baseband signals. Mixer 814 provides the I and Q baseband signals to programmable gain amplifier 822, which selectively adjusts a gain of the I and Q baseband signals and provides the adjusted I and Q baseband signals to I and Q analog-to-digital converters (ADCs) 824 and 826. ADCs 824 and 826 convert the I and Q baseband signals into digital signals, which are provided to digital signal processor (DSP) 828.

DSP 828 can be configured to process and/or compress the I and Q baseband signals. In a mobile telephone application, for example, the DSP 828 can be configured to compress spoken audio signals and to send and receive digital signals. In audio systems, such as radio receiver circuits or television receivers, DSP 828 can be used to provide equalization of audio signals in high fidelity and/or to process audio/video signals. DSP 828 is coupled to general purpose output circuit 840 and control interface 842 to communicate data to and receive data from other circuitry, such as control circuit 422.

Additionally, DSP 828 provides processed I and Q baseband signals to edge adjustment circuitry 830, which may include two edge adjustment circuits in parallel, such as edge adjustment circuits 220, 420, and 620 illustrated in FIGS. 2A, 4, and 6. For example, edge adjustment circuitry 830 can include two copies of edge adjustment circuit 620 from FIG. 6 clocked using second clock source 831, such that one of the edge adjustment circuits outputs the right output (Rout) signal and the other outputs the left output (Lout) signal.

Edge adjustment circuit 830 selectively alters edge timing of both the I and Q baseband signals based on a clock signal from second clock source 831. Though second clock source 831 is depicted as being external to edge adjustment circuit 830, in other embodiments, second clock source 831 can be included within edge adjustment circuit 830. Edge adjustment circuit 830 adjusts edge timing of the processed I and Q baseband signals and provides the adjusted signals to data circuit 112 through data buffers 832 and 836 and through respective right and left digital input/output (I/O) pins 834 and 838 and across right and left outputs (communications links 114). In some embodiments, the second clock source 831 may be coupled to local oscillator 816.

By selectively adjusting edge timing of transitions within the processed I and Q baseband signals using edge adjustment circuit 830, digital signals can be communicated to data circuit 112 across the communications links 114 without radiating interference at a radio frequency of interest with respect to antenna 802. In particular, an output power spectrum of the Rout and Lout baseband signals transmitted across the communications links 114 to data circuit 112 have frequency nulls at a desired radio frequency ($1/T_2$). As discussed above, second clock source 831 can provide a second clock signal having a clock rate that differs from a clock rate of the digital data stream and that is selected to introduce spectral nulls into the modulated output signal(s) at the radio frequency of interest and harmonics thereof. In response to the second clock signal, edge adjustment circuit 830 can selectively alter edge timing of transitions within the processed I and Q baseband signals, for example, as a function of an integer plus one half times a clock period ($T_2$) of the second clock signal, as described above.

Signal processing circuit 804 includes adjustable frequency circuit 818 coupled to receiver clock pin 820, which is accessible by control circuitry, such as control circuit 422 to adjust a clock rate of local oscillator 816. The clock rate of local oscillator 816 can be adjusted to alter the intermediate frequency of the I and Q baseband signals.

Further, signal processing circuit 804 includes pins 836 through which control circuitry 422 can communicate with control interface 842. Through control interface 842, for example, control circuit 422 can alter a second clock rate of second clock source 831, adjusting frequency nulls produced by edge adjustment circuitry 830 within the Rout and Lout signals.

In an embodiment, control signals transmitted and received through control interface 842 and general purpose output circuit 840 and through pins 836 are at a data rate that does not radiate interference at a radio frequency of interest. However, in an alternative embodiment where high-speed transmission of control signals are provided through pins 836, control interface 842 and general purpose output circuit 840 may include edge adjustment circuitry, such as edge adjustment circuitry 830.

In operation, edge adjustment circuitry 830 selectively alters edge timing of transitions within modulated data signals transmitted over communications links 114 to data circuit 112, introducing spectral nulls in the output power spectrum of each of the modulated data signals to reduce radiated interference at a radio frequency of interest. Control circuitry 422 is configured to alter a clock frequency of second clock 831 to alter the frequency at which the spectral nulls appear.

Figure 9:
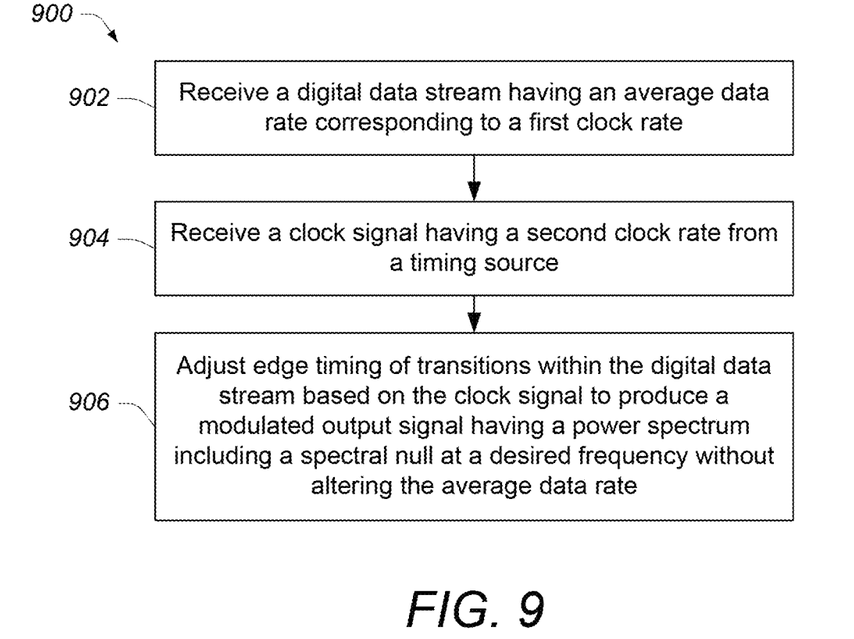
FIG. 9 is a flow diagram of an embodiment of a method of re-clocking a data signal.

FIG. 9 is a flow diagram 900 of an embodiment of a method of re-clocking an input signal by selectively altering edge timing. At 902, a digital data stream is received that has an average data rate corresponding to a first clock rate. In an example, the digital data stream may be received from a signal source that is coupled to a first clock having the first clock rate, such that the digital data stream has a data rate that corresponds to the first clock rate.

Advancing to 904, a clock signal is received from a timing source that has a second clock rate. The second clock signal can have a clock period ($T_2$) that differs from a clock period ($T_1$) of a first clock signal. The second clock rate ($1/T_2$) may be selected to correspond to a frequency of interest of a nearby receiver circuit.

Continuing to 906, edge timing of transitions within the digital data stream is adjusted based on the clock signal to produce a modulated output signal having a power spectrum including a spectral null at a desired frequency (and its harmonics) without altering the average data rate. In an example, edge timing can be adjusted by latching the digital data stream into a data storage element (such as a data flip-flop circuit) at the second clock rate. In another example, edge timing can be adjusted by selectively latching the digital data stream into a data storage element according to the clock signal or an inverted version of the clock signal.

In another embodiment, transitions within the modulated output signal may be used to generate a control signal. In some instances in such embodiments, edge timing can be adjusted by selecting between the clock signal and an inverted version of the clock signal as a clock input to a data storage element based on the control signal.

In other instances transitions can be used to generate a control signal. In one example, edge timing can be adjusted by latching the digital data stream into a data storage element (such as a flip-flop circuit) based on a falling edge of the clock signal to produce a first modulated signal and into a second data storage element based on a rising edge of the clock signal to produce a second modulated signal. The modulated output signal may be produced by selectively providing the first modulated signal or the second modulated signal to an output based on the control signal. In another example, edge timing can be adjusted by selectively outputting a first or second modulated data stream based on the control signal.

Figure 10:
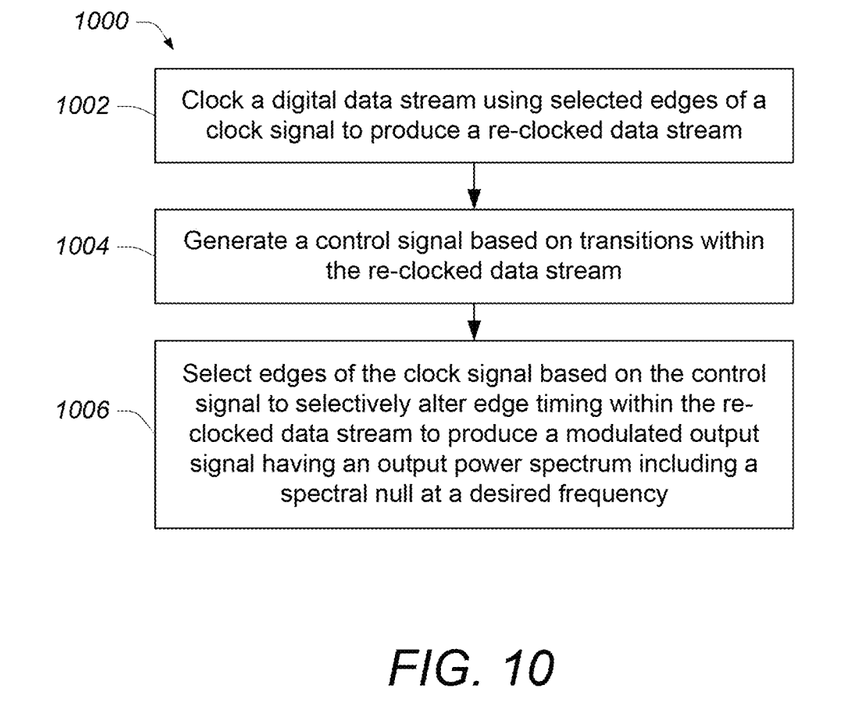
FIG. 10 is a flow diagram of a second embodiment of a method of re-clocking a data signal.

FIG. 10 is a flow diagram 1000 of an embodiment of a method of re-clocking a data signal. At 1002, a digital data stream is clocked using selected edges of a clock signal to produce a re-clocked data stream. In an example, the clock signal may be provided to a clock input of a data storage element, such as a data flip-flop circuit, which shifts data on rising edges of the clock signal.

Advancing to 1004, a control signal is generated based on transitions within the re-clocked data stream. For example, referring to FIG. 4, the re-clocked data stream is provided both to the digital I/O pin 110 and to a clock input of a logic circuit, such as a data flip-flop configured to toggle between states. The output of the logic circuit may be used as a control signal to control a multiplexer to selectively provide one of a clock signal or an inverted version of the clock signal to the data storage element to re-clock the digital data stream.

Continuing to 1006, edges (such as rising edges or falling edges) of the clock signal are selected based on the control signal to selectively alter edge timing within the re-clocked data signal to produce a modulated output signal having a power spectrum with a spectral null at a desired frequency (and its harmonics). The desired frequency may correspond to a radio frequency of concern to nearby radio frequency receiver circuitry. In an embodiment, adjacent rising edges of the modulated output signal can be shifted by an integer plus one-half times a period of the clock signal relative to adjacent rising edges within the digital data stream. In one example, the edge timing is selectively altered without changing an average data rate associated with the received digital data stream.

In another embodiment, the clock signal has a clock frequency corresponding to the desired frequency. Further, the clock signal has a clock rate that is different from a clock rate of the digital data stream. In still another embodiment, edges of the clock signal are selected by selectively applying one of the clock signal or an inverted version of the clock signal to a clock input of a re-clock flip-flop circuit to alter the edge timing. In still another embodiment, edges of the clock signal are selected by selectively outputting one of a first re-clocked data stream (based on a rising edge of the clock signal) or a second re-clocked datastream (based on a falling edge of the clock signal) according to the selection signal.

Many additional modifications and variations may be made in the techniques and structures described and illustrated herein without departing from the spirit and scope of the present disclosure. For example, the second clock source 228 depicted in FIGS. 2a, 4, and 6 may be derived from first clock source 106. Further, referring to circuit device 804 depicted in FIG. 8, one or both of the clock sources (local oscillator 816 and second clock 831) may be external to circuit device.

Additionally, referring to the methods described in FIGS. 9 and 10, it should be understood that other processing, transmitting, or tuning steps may be performed before, after, or between the blocks identified in the figures, depending on the specific implementation. Additionally, the described techniques may be used with measurement devices, communication devices, or any circuit that communicates digital data and for which emission of electromagnetic interference (EMI) is controlled. Accordingly, the present invention should be clearly understood to be limited only by the scope of the claims and the equivalents thereof.

We claim:

1. A method of re-clocking an input signal, the method comprising:
   receiving a digital data stream having an average data rate corresponding to a first clock rate;
   receiving a clock signal having a second clock rate from a timing source;
   adjusting edge timing of transitions within the digital data stream based on a selected one of the clock signal and an inverted version of the clock signal in response to a control signal to produce an output signal re-clocked according to the selected one of the clock signal and the inverted version of the clock signal and having a power spectrum including a spectral null at a desired frequency without altering the average data rate;
   generating the control signal in response to transitions in the output signal; and
   altering the control signal based on the transitions in the output signal using a flip flop circuit having a clock input configured to receive the output signal, a data input, and a data output coupled to the data input through an inverter, the flip-flop circuit configured to toggle an output signal to produce the control signal.

2. The method of claim 1, wherein adjusting edge timing of transitions comprises latching the digital data stream in a data storage element at the second clock rate based on edges of the clock signal.

3. The method of claim 1, wherein adjusting edge timing of transitions comprises:
   providing the clock signal to a first input of a multiplexer, the multiplexer including a second input, a select input, and an output;
   providing the inverted version to the second input of the multiplexer; and
   receiving the control signal at the select input, the control signal changing in response to the transitions within the output signal.

4. The method of claim 1, wherein the second clock rate is greater than the first clock rate.

5. The method of claim 1, wherein adjusting edge timing of transitions comprises selectively providing one of the clock signal and the inverted version of the clock signal as a clock input to a data storage element based on the control signal.

6. The method of claim 1, wherein adjusting edge timing of transitions comprises:
   latching the digital data stream to a first output based on a falling edge of the clock signal to produce a first signal;
   latching the digital data stream to a second output based on a rising edge of the clock signal to produce a second signal; and
   selectively providing one of the first signal and the second signal to an output to produce the output signal based on the control signal.

7. A method of re-clocking a data signal, the method comprising:
   clocking a digital data stream using selected edges of a clock signal to produce a re-clocked data stream;
   generating a control signal based on transitions within the re-clocked data stream; and selecting edges of the clock signal based on the control signal to selectively apply one of the clock signal and an inverted version of the clock signal to a clock input of a re-clock flip-flop circuit to selectively alter edge timing within the re-clocked data stream such that the re-clocked data stream has an output power spectrum including a spectral null at a frequency of the clock signal; and wherein selecting edges of the clock signal based on the control signal shifts timing of rising and falling edges within the re-clocked data stream such that spectral energy pulses produced by rising edges cancel each other and spectral energy pulses produced by falling edges cancel each other to produce the spectral null.

8. The method of claim 7, wherein the edge timing is selectively altered without changing an average data rate associated with the digital data stream.

9. The method of claim 7, wherein selecting edges of the clock signal based on the control signal shifts timing of edges within the re-clocked data stream by an integer plus one-half times a period of the clock signal.

10. The method of claim 7, wherein selecting edges of the clock signal based on the control signal comprises selectively outputting one of a first re-clocked data stream or a second re-clocked data stream based on the control signal;

wherein the first re-clocked data stream is based on a rising edge of the clock signal; and wherein the second re-clocked data stream is based on a falling edge of the clock signal.

11. A circuit device to re-clock an input signal, the circuit device comprising:

an input to receive a digital data stream having a first clock rate;

a clock input to receive a clock signal having a second clock rate;

a clock source coupled to the clock input to provide the clock signal, and including a clock control input;

a control circuit coupled to the clock control input and configured to determine a selected frequency and to control the second clock rate of the clock source in response to determining the selected frequency; and an edge adjustment circuit configured to re-clock the digital data stream using a selected one of the clock signal and an inverted version of the clock signal in response to a control signal, the edge adjustment circuit configured to apply the selected one to selectively alter edge timing of transitions within the digital data stream to produce at least one re-clocked output signal having a power spectrum including a spectral null at the selected frequency and its harmonics, the edge adjustment circuit to produce the control signal based on transitions in the at least one re-clocked output signal to determine the selected one;

wherein the edge adjustment circuit applies the selected one to selectively alter edge timing of transitions within the digital data stream to shift timing of edges within the digital data stream by an integer plus one-half times a period of the clock signal.

12. The circuit device of claim 11, wherein the edge adjustment circuit comprises a data storage element configured to latch the digital data stream from the input to an output based on selected edges of one of the clock signal and the inverted version of the clock signal.

13. The circuit device of claim 11, further comprising a digital signal source coupled to the input and configured to produce the digital data stream.

14. The circuit device of claim 11, wherein the selected frequency comprises a radio frequency of a nearby receiver circuit.

15. The circuit device of claim 11, wherein the edge adjustment circuit comprises:

a logic circuit configured to produce a control signal based on transitions within the digital data stream;

a multiplexer including a first input to receive the clock signal, a second input to receive the inverted version of the clock signal, and a select input to receive the control signal, the multiplexer to provide one of the clock signal and the inverted version of the clock signal to an output; and a data storage element including a data input to receive the digital data stream, a clock input coupled to the output of the multiplexer, and an output, the data storage element to produce the re-clocked output signal based on one of the clock signal or the inverted version of the clock signal.

16. The circuit device of claim 11, wherein the edge adjustment circuit comprises:

a first data storage element configured to latch the digital data stream according to a rising edge of the clock signal to produce a first data signal;

a second data storage element configured to latch the digital data stream according to a falling edge of the clock signal to produce a second data signal;

a logic circuit configured to generate a control signal based on the first and second data signals; and a multiplexer including a first input coupled to the first data storage element to receive the first data signal, a second input coupled to the second data storage element to receive the second data signal, and a select input configured to receive the control signal, the multiplexer to selectively provide one of the first data signal and the second data signal to an output as the re-clocked output signal based on the control signal.

17. The circuit device of claim 11, wherein the edge adjustment circuit produces the re-clocked output signal without changing an average data rate relative to the digital data stream.

* * * * *